(12) United States Patent
Czaplicki

(10) Patent No.: US 6,263,635 B1
(45) Date of Patent: *Jul. 24, 2001

(54) TUBE REINFORCEMENT HAVING DISPLACEABLE MODULAR COMPONENTS

(75) Inventor: Michael J. Czaplicki, Rochester, MI (US)

(73) Assignee: L&L Products, Inc., Romeo, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/460,322

(22) Filed: Dec. 10, 1999

(51) Int. Cl.$^7$ ...................................................... E04C 3/30
(52) U.S. Cl. ........................................ 52/731.6; 52/309.9
(58) Field of Search ................................ 52/309.9, 736.3

(56) References Cited

U.S. PATENT DOCUMENTS

| | | |
|---|---|---|
| 3,123,170 | 3/1964 | Bryant . |
| 3,493,257 | 2/1970 | Fitzgerald et al. . |
| 3,665,968 | 5/1972 | DePutter . |
| 4,019,301 | 4/1977 | Fox . |

(List continued on next page.)

FOREIGN PATENT DOCUMENTS

| | | |
|---|---|---|
| 0 891 918 A1 | 1/1999 | (EP) . |
| 0 893 331 A1 | 1/1999 | (EP) . |
| 0 893 332 A1 | 1/1999 | (EP) . |
| 5-38992 | 2/1993 | (JP) . |
| PCT/JP88/ 00029 | 7/1989 | (WO) . |
| PCT/US97/ 10693 | 6/1997 | (WO) . |
| PCT/US97/ 07644 | 11/1997 | (WO) . |
| PCT/US97/ 19981 | 11/1997 | (WO) . |
| PCT/US98/ 08980 | 11/1998 | (WO) . |
| PCT/US98/ 16461 | 2/1999 | (WO) . |

OTHER PUBLICATIONS

Co–pending U.S. Application Ser. No. 09/428,243, filed Oct. 27, 1999.

Co–pending U.S. Application Ser. No. 09/459,756, filed Dec. 10, 1999.

Primary Examiner—Carl D. Friedman
Assistant Examiner—Steve Varner
(74) Attorney, Agent, or Firm—Dobrusin Darden Thennisch & Lorenz PC

(57) ABSTRACT

A tube reinforcement assembly is designed to reinforce complex tube structures, such as those having bends and/or varying cross-sectional areas. The assembly includes a plurality of modular pillars, each having a structural foam coating. The modular pillars are grouped together with resilient retaining mechanisms or by an external positioning mechanism to form an assembly having a resiliently variable cross-sectional area. When the assembly is placed inside a tube structure, the pillars are squeezed together to fit around bends or in areas having smaller cross-sectional areas in the tube structure. When the assembly reaches an area in the tube structure having a larger cross-sectional area, the resilient connection between the pillars allow the pillars to separate and fill the extra space, holding the assembly in place temporarily. Once the reinforcement assembly is in a selected area, the structural foam is expanded to hold the assembly in place permanently and reinforce the tube structure at that point. Because of the modular design, tube structures having larger cross-sectional areas can be reinforced by simply adding more pillars to the assembly rather than manufacturing a completely new reinforcement member.

20 Claims, 3 Drawing Sheets

U.S. PATENT DOCUMENTS

| | | |
|---|---|---|
| 4,082,825 | 4/1978 | Puterbaugh . |
| 4,238,540 | 12/1980 | Yates et al. . |
| 4,397,490 | 8/1983 | Evans et al. . |
| 4,732,806 | 3/1988 | Wycech . |
| 4,751,249 | 6/1988 | Wycech . |
| 4,762,352 | 8/1988 | Enomoto . |
| 4,803,108 | 2/1989 | Leuchten et al. . |
| 4,836,516 | 6/1989 | Wycech . |
| 4,853,270 | 8/1989 | Wycech . |
| 4,861,097 | 8/1989 | Wycech . |
| 4,898,630 | 2/1990 | Kitoh et al. . |
| 4,901,500 | 2/1990 | Wycech . |
| 4,908,930 | 3/1990 | Wycech . |
| 4,922,596 | 5/1990 | Wycech . |
| 4,923,902 | 5/1990 | Wycech . |
| 4,978,562 | 12/1990 | Wycech . |
| 4,995,545 | 2/1991 | Wycech . |
| 5,124,186 | 6/1992 | Wycech . |
| 5,213,391 | 5/1993 | Takagi . |
| 5,255,487 | 10/1993 | Wieting et al. . |
| 5,266,133 | 11/1993 | Hanley et al. . |
| 5,344,208 | 9/1994 | Bien et al. . |
| 5,373,027 | 12/1994 | Hanley et al. . |
| 5,395,135 | 3/1995 | Lim et al. . |
| 5,506,025 | 4/1996 | Otto et al. . |
| 5,575,526 | 11/1996 | Wycech . |
| 5,580,120 | 12/1996 | Nees et al. . |
| 5,707,098 | 1/1998 | Uchida et al. . |
| 5,725,272 | 3/1998 | Jones . |
| 5,731,069 | 3/1998 | Delle Donne et al. . |
| 5,755,486 | 5/1998 | Wycech . |
| 5,766,719 | 6/1998 | Rimkus . |
| 5,785,376 | 7/1998 | Nees et al. . |
| 5,786,394 | 7/1998 | Slaven . |
| 5,855,094 | 1/1999 | Baudisch et al. . |
| 5,884,960 | 3/1999 | Wycech . |
| 5,885,688 | 3/1999 | McLaughlin . |
| 5,888,600 | 3/1999 | Wycech . |
| 5,934,737 | 8/1999 | Abouzahr . |
| 5,984,389 | 11/1999 | Nuber . |
| 5,992,923 | 11/1999 | Wycech . |
| 6,003,274 | 12/1999 | Wycech . |
| 6,022,066 | 2/2000 | Tremblay et al. . |
| 6,058,673 | 5/2000 | Wycech . |

TUBE REINFORCEMENT HAVING DISPLACEABLE MODULAR COMPONENTS

TECHNICAL FIELD

The present invention relates to structural reinforcements, and more particularly to a reinforcement assembly designed to reinforce complex tubular structures and having a plurality of pillars connected together in a resilient manner to allow the reinforcement to fit through varying cross-sectional areas and bends in the tubular structure.

BACKGROUND ART

Complex tubular members including hydroformed tube structures are used in many applications, such as in automobile A-pillars, B-pillars, C-pillars, the hinge pillar area, rocker panels, the wheel hub area, motor rails, and similar structures. In these tube structures, it is often desirable to place reinforcements at selected areas for added strength. In more complex tube structures, however, it can be difficult to place a reinforcement at a desired location because of bends and varying cross-sectional areas in the structure. Any reinforcement member for such a structure needs to be small enough to fit through the entire length of the tube, including the bends and narrower areas, and yet still be able to stay in place at a desired reinforcement location, even if the location has a larger cross-sectional area. Commonly, either the reinforcement member is too large to pass through smaller areas of the tube structures to reach the desired location, or the reinforcement member is too small to stay secured at the desired location once it is positioned.

Structural foam materials, often used with a carrier, can be used to create a reinforcement member that conforms to the tube structure and provides reduced stress distribution along the reinforcement. Placing and keeping the structural foam at the desired reinforcement location before the foam is expanded and cured, however, still can be difficult for the reasons noted above.

There is a need for a reinforcement assembly that is small enough to fit around curves and through smaller cross-sectional areas in a tubular structural member, yet will not shift position once it is placed at a desired location within the tube structure, even if the tube structure is moved before the reinforcement assembly is attached permanently to the tube structure.

SUMMARY OF THE INVENTION

The present invention is directed to a reinforcement assembly for reinforcing complex tube structures, particularly tube structures having bends and/or varying inner cross-sectional areas. The assembly includes a plurality of modular pillars arranged in a spaced relationship and held together at least at one location by a retainer, such as a plurality of fingers from a positioning mechanism or a resilient retaining mechanism. Many other retention mechanisms can be envisioned. For example, the retainer can be placed away from the end and held in place by a recessed area in the structural foam coating. Each pillar is coated with a load distributing medium, such as an expandable structural foam layer, on its outer surface. To reinforce a tube structure, the assembly is placed inside the tube and guided to the desired location to be reinforced. As the assembly passes through bends and smaller cross-sectional areas in the tube structure, the individual pillars move closer together so that the assembly will not become trapped in the tube. If the assembly moves into an area that has a larger cross-sectional area, the retainer allows the individual pillars to move back outward, holding the assembly in place at a desired location before the tube structure undergoes final processing.

To complete the tube structure reinforcement, the load distributing medium is expanded, causing the individual pillars to fuse together and form a rigid reinforcement structure. The medium on the outer surface of each pillar presses against or bonds to the inner walls of the tube structure or to adjacent pillars, ensuring that the reinforcement assembly stays in place and distributes loads properly.

DETAILED DESCRIPTION OF THE PREFERRED EMBODIMENTS

Figure 1:
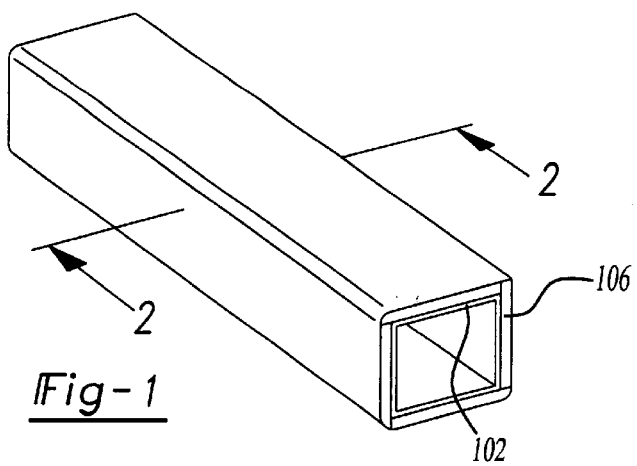
FIG. 1 is a perspective view of a single modular pillar used in the reinforcement assembly of the present invention.
Figure 2:
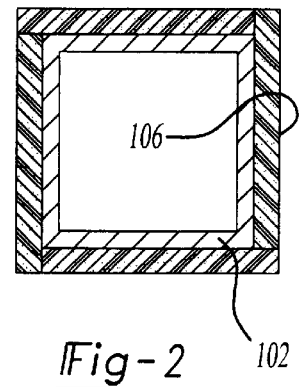
FIG. 2 is a cross-sectional view of the modular pillar taken along line 2—2 of FIG. 1.
Figure 3:
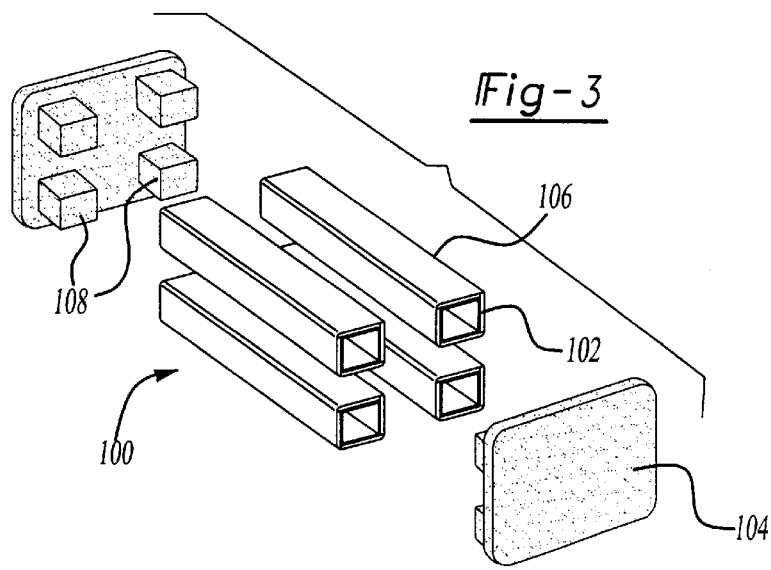
FIG. 3 is an exploded view of one embodiment of the inventive reinforcement assembly.

Referring to FIGS. 1 through 3, a reinforcement assembly 100 according to the present invention includes a plurality of pillars 102 arranged in any desired spaced relationship and at least one optional retaining mechanism 104 retaining the pillars 102 together. The pillars 102 can be made of any rigid material that is appropriate for the reinforcing application in which the assembly 100 will be used, such as aluminum, nylon, polysulfane, magnesium, and steel. Although the figures illustrate pillars having a square cross-section, the pillars 102 can have any cross-sectional shape, such as a circular, hexagonal or even a randomly generated shape. The pillars 102 are preferably tubular and can be formed by any known process, such as extrusion, injection molding, roll forming, thermoformning, etc.

Each pillar 102 has an expandable stress reducing medium 106 disposed on at least one surface, and preferably on all of its surfaces. Though other load distributing media can be used, a preferred load distributing medium is an expandable polymer, and preferably one that is foamable. A particularly preferred material is an epoxy-based structural foam. For example, without limitation, in one embodiment, the structural foam is an epoxy-based material. The structural foam may also include an ethylene copolymer or terpolymer with at least one monomer being an alpha-olefin. As a copolymer or terpolymer, the ethylene is combined with two or three different monomers, i.e., small molecules with high chemical reactivity that are capable of linking up with similar molecules.

A number of epoxy-based structural reinforcing foams are known in the art and may be used as the load distributing medium 106. A typical structural foam includes a polymeric base material, such as an epoxy resin or ethylene-based polymer which, when compounded with appropriate ingredients (typically a blowing agent, curing agent and filler) expands and cures in a reliable and predicable manner upon the application of heat or the occurrence of a particular ambient condition. The resulting material has a density that is sufficient to impart desired rigidity to a supported article. From a chemical standpoint for a thermally-activated material, the structural foam is usually initially processed as a flowable thermoplastic material before curing. It will cross-link upon curing to create a thermoset material.

An example of a preferred structural foam formulation is an epoxy-based material that may include an ethylene copolymer or terpolymer and is commercially available from L&L Products of Romeo, Mich., under the designations L5206, L5207, L5208 and L5209. One advantage of the preferred structural foam materials over prior art materials is that the preferred materials can be processed in several ways. The preferred materials can be processed by injection molding, extrusion or with a mini-applicator type extruder. This enables the formulation when combined with appropriate part design to exceed the capability of most prior art materials. In one preferred embodiment, the structural foam (in its uncured state) generally is dry or relatively free of tack to the touch.

While the preferred materials for fabricating the structural foam have been disclosed, the structural foam can be formed of other materials provided that the material selected is heat-activated or otherwise activated by an ambient condition (e.g. moisture, pressure, time or the like) and expands in a predictable and reliable manner under appropriate conditions for the selected application. Possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also, U.S. Pat. Nos. 5,766,719; 5,755,486; 5,575,526; and 5,932,680, (incorporated by reference). In general, the desired characteristics of the structural foam include relatively high stiffness, high strength, high glass transition temperature (typically greater than 70 degrees Celsius), and good corrosion and humidity resistance properties. In this manner, the material does not generally interfere with the materials systems employed by automobile manufacturers.

In applications where a heat activated, thermally expanding material is employed, an important consideration involved with the selection and formulation of the material comprising the structural foam is the temperature at which a material reaction or expansion, and possibly curing, will take place. For instance, in most applications, it is undesirable for the material to be reactive at room temperature or otherwise at the ambient temperature in a production line environment. More typically, the structural foam becomes reactive at higher processing temperatures, such as those encountered in an automobile assembly plant, when the foam is processed along with the automobile components at elevated temperatures or at higher applied energy levels, e.g., during painting preparation steps. While temperatures encountered in an automobile assembly operation may be in the range of about 148.89° C. to 204.44° C. (about 300° F. to 400° F.), body and paint shop applications are commonly at least 93.33° C. (about 200° F.) or slightly higher. If needed, blowing agents activators can be incorporated into the composition to cause expansion at different temperatures outside the above ranges.

Generally, suitable expandable foams have a range of expansion ranging from approximately 0 to over 1000 percent. The level of expansion of the structural foam 14 may be increased to as high as 1500 percent or more, with the most preferred expansion between 0 and 300 percent.

Figure 4:
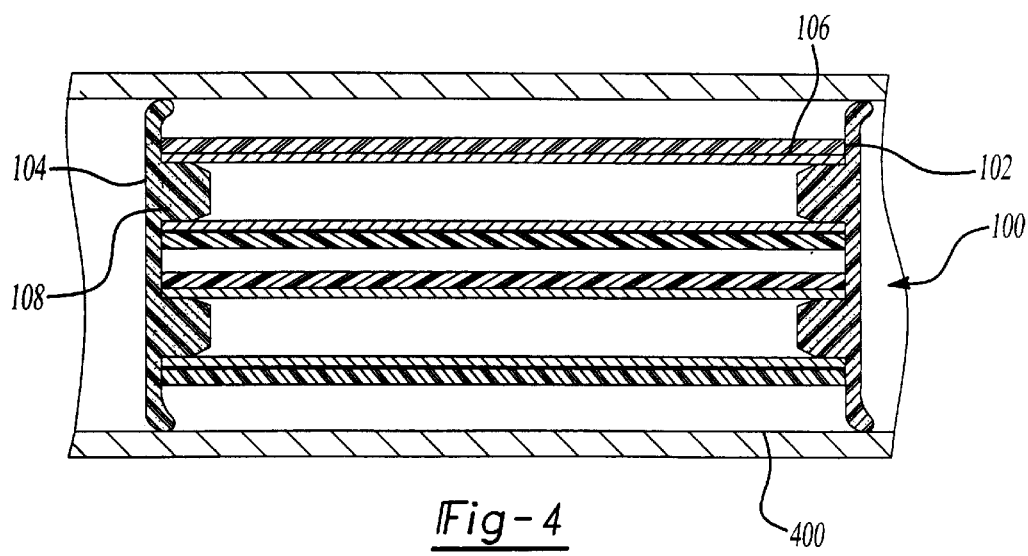
FIG. 4 is a cross-sectional view of the reinforcement assembly of FIG. 3 compressed inside a tube structure before curing.
Figure 5:
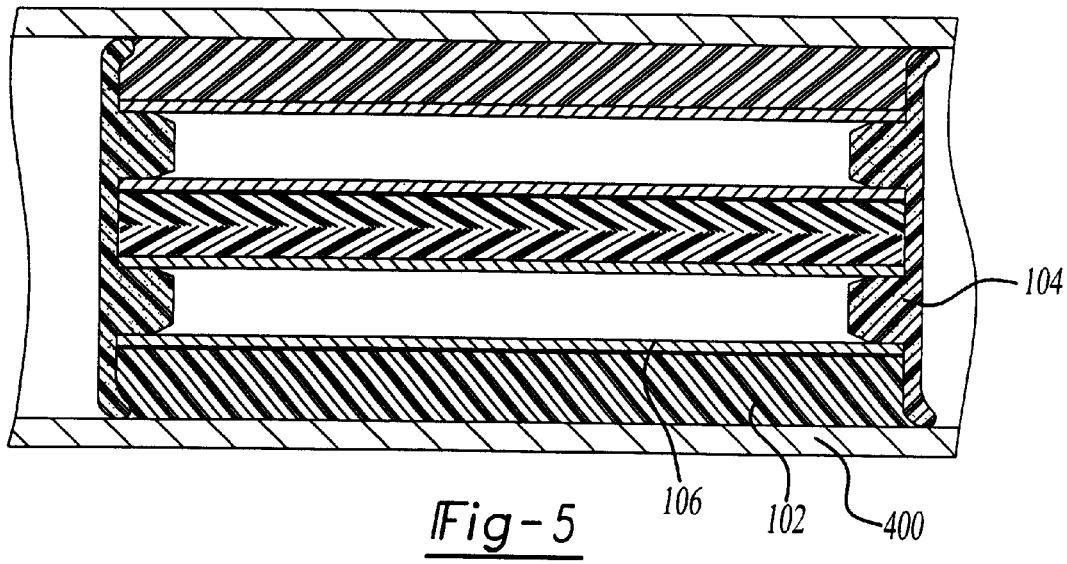
FIG. 5 is a cross-sectional view of the assembly shown in FIG. 4 after curing.
Figure 6:
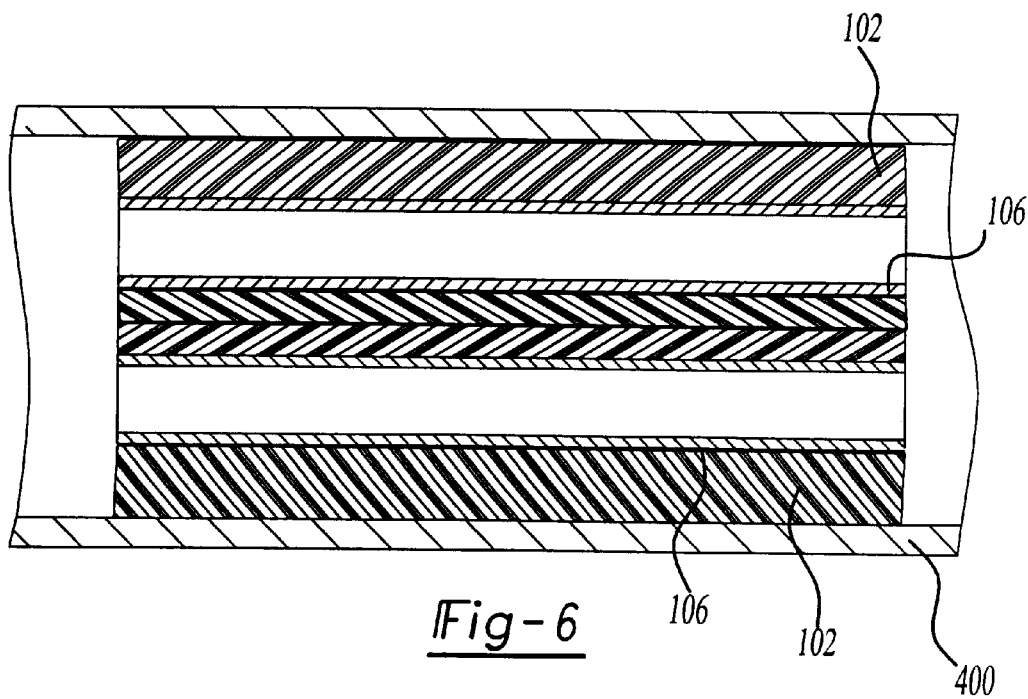
FIG. 6 is another cross-sectional view of another embodiment of the inventive reinforcement assembly after curing.

The optional retaining mechanism 104 retaining the pillars 102 together are preferably made of a resilient material, such as materials that are compressible but will not decompose when exposed to body shop oven temperatures. This includes certain elastomeric, foamed and unfoamed that have adequate temperature resistance. Nonelastomeric materials such as nylon can be used as well. The retainer construction would be different; however, in the case of rigid thermoplastic use. The necessary flexibility would result from the hinging action of the polymer retainer, in the embodiment shown in FIGS. 3 through 5, the retaining mechanisms 104 have protrusions 108 that fit into the hollow ends of the pillars 102, but the retaining mechanisms 104 can be attached to the pillars 102 via any other known means, such as by placing indentations in the retaining mechanism 104 and fitting the pillars 102 into the indentations or by using an adhesive. Note that the retaining mechanisms 104 do not necessarily have to be removed after the assembly is put into place within a tube structure 400. To keep the pillars 102 securely attached to the retaining mechanisms 104, the end of the pillars 102 can be crimped to fit more securely over the protrusions 108 on the retaining mechanism 104. An adhesive can also be placed on the retaining mechanism 104 so that it bonds with the pillar 102. If the assembly 100 were to be placed in the structure 400 before a hydroforming operation, the retaining mechanism 104 could have openings to allow fluid to flow easily through both the retaining mechanism 104 and the pillar 102. Also, the retaining mechanisms 104 may be manufactured so that they are degradable at high temperatures, acting as temporary retainers that disappear once the structural foam 106 has expanded to hold the reinforcement assembly 100 in place permanently.

Alternatively, the pillars 102 can be retained and kept into position by a plurality of fingers from an external positioning device. In this embodiment, the fingers fit inside one end of the pillars 102 to hold them in position. If fingers are used to hold the pillars 102 in place rather than an retaining mechanism 104, the reinforcement assembly 100 can be put into place as part of the manufacturing operation for forming the tube structure. For example, the assembly 100 could be placed in the hydroform tube 400 before the tube 400 is bent into its final form. After the assembly 100 is positioned, the hydroform mold can be bent, locking the assembly 100 into place. The fingers are then extracted, leaving the assembly 100 in place due to the plastic deformation of the mold. The tube structure is then hydroformed within the mold, around the reinforcement assembly 100. Because the pillars 102 are hollow, the pillars 102 do not impede the flow of liquid during the hydroforming operation. Further, as long as the pillars 102 are able to withstand the hydrostatic pressure created in the hydroforming application (e.g., if they are made from a rigid material such as nylon or steel), they will not collapse.

Figure 7A:
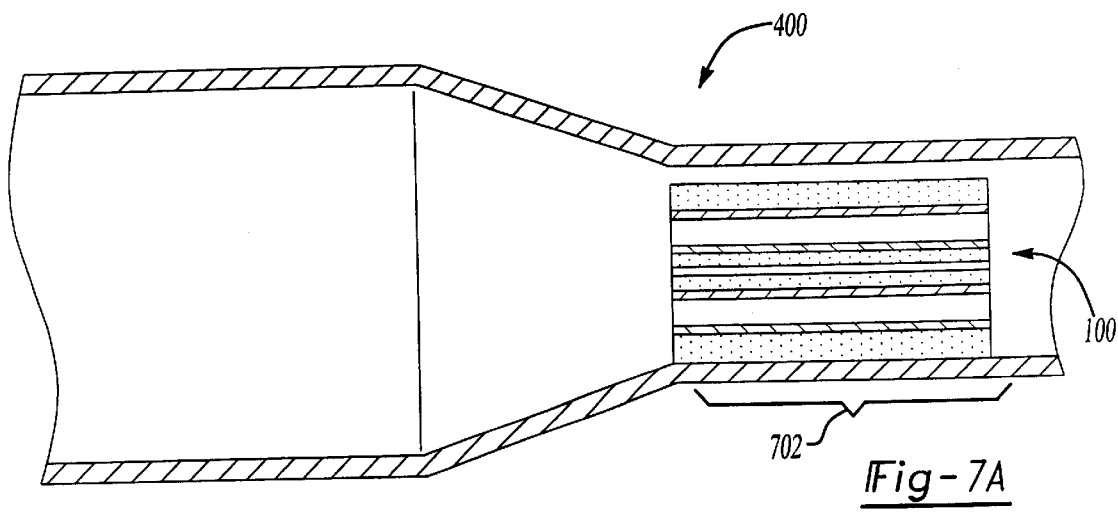
FIGS. 7A through 7C are cross-sectional views illustrating the process by which the reinforcement assembly of the present invention is positioned and anchored inside a tube structure 400.
Figure 7B:
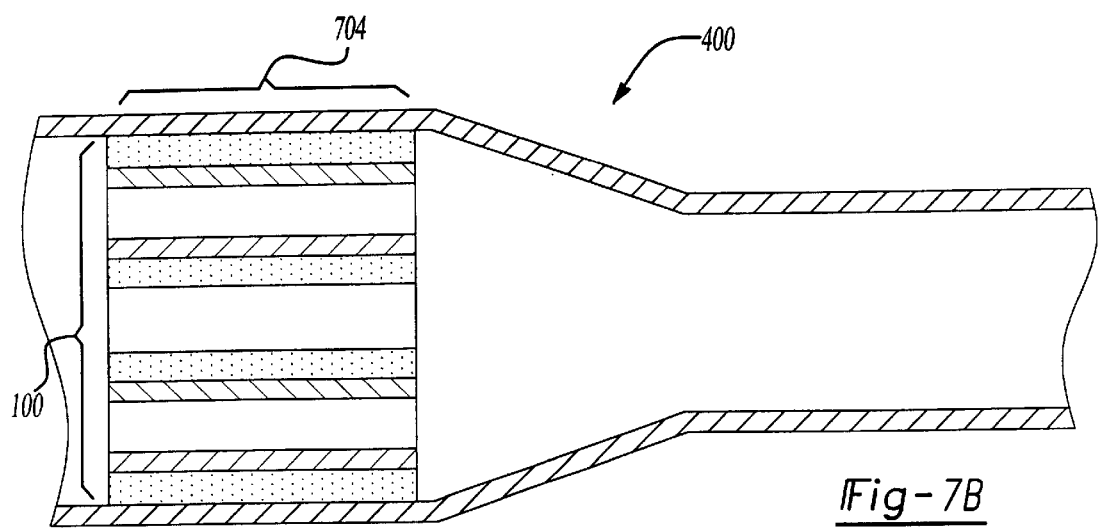
Figure 7C:
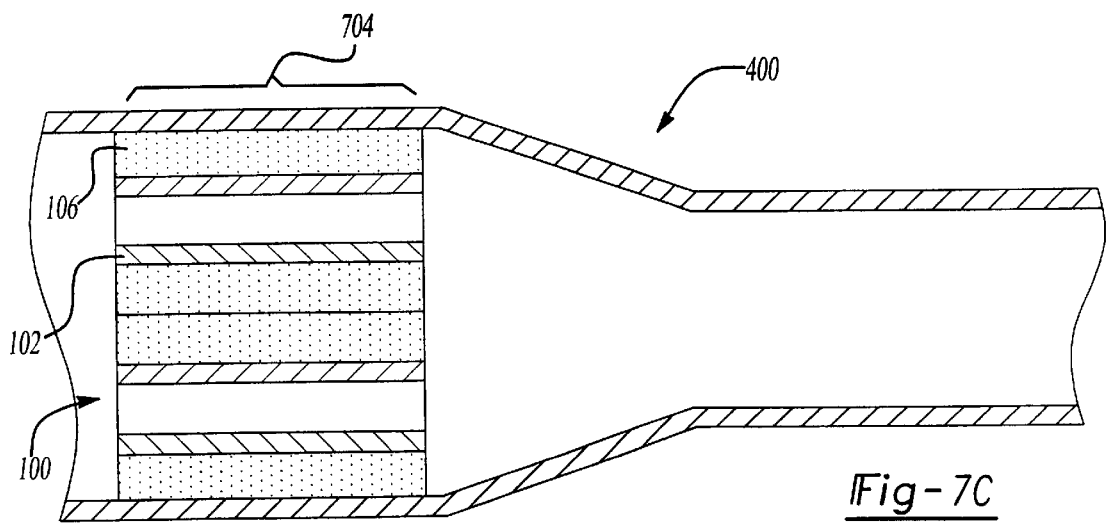

FIGS. 7A through 7C illustrate one way in which the reinforcement assembly 100 can be placed and secured inside the tube structure 400. In FIG. 7A, the reinforcement assembly 100 is shown pushed into a narrower section 702 of the tube 400, causing the pillars 102 to move toward a compressed position to accommodate the narrower space. FIG. 7B shows the assembly 100 at the desired area to be reinforced 704, which is shown to have a larger cross-sectional area than the narrow section 702. As shown in FIG. 7B, either the biasing force of the retaining mechanism 104 material or the mechanical movement of the external positioning device moves the pillars 102 outward and away from each other. As a result, the assembly 100 is held securely into position when the pillars 102 press against the inner walls of the tube 400. FIG. 7C shows the assembly 100 after the structural foam layer 106 has been expanded and cured. Once the structural foam 106 has expanded and cured, the pillars 102 and foam 106 fuse together to form a single reinforcing piece held rigidly inside the tube structure 400. The structural foam 106 and the pillars 102 distributes loads placed on the tube 400 and helps prevent the tube 400 from deforming when the load is applied.

As a result, the invention allows precise, easy placement of a reinforcement assembly into a complex tube structure by allowing the total dimensions of the assembly, via the modular, movable pillars, to accommodate varying tube structure dimensions. Further, the relatively hollow cross-section of the invention and the placement of the structural foam minimizes the amount of material needed to reinforce the tube structure, reducing both the weight and the cost of the reinforcement. In addition, different tube cross sectional shapes and areas can be easily accommodated, without having to manufacture new reinforcement members for each shape, by adding or removing pillars from the assembly.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A reinforcement assembly for reinforcing a tubular structural member, comprising:
   a plurality of rigid pillars arranged in a spaced relationship;
   a resilient retainer coupled to a first end of said plurality of pillars; and
   a load distributing medium disposed on at least one surface of each of said plurality of pillars,
   wherein, upon insertion of the assembly in the tubular structural member, the retainer allows the plurality of pillars to move toward and away from each other to accomniodate changing cross-sectional areas of the tubular structural member.

2. The reinforcement assembly of claim 1, wherein at least one of said plurality of pillars has a cross-sectional shape selected from the group consisting of round, square, and hexagonal.

3. The reinforcement assembly of claim 1, wherein said plurality of pillars are made of at least one selected from the group including steel, aluminum, magnesium, nylon, polysulfone, and sheet molding compound.

4. The reinforcement assembly of claim 1, wherein said plurality of pillars are tube-shaped.

5. The reinforcement assembly of claim 1, wherein said retainer is an retaining mechanism coupled to the first ends of said plurality of pillars.

6. The reinforcement assembly of claim 5, wherein said plurality of pillars are tube-shaped, and wherein said retaining mechanism is attached to said plurality of pillars via integrally formed protrusions that fit inside the first ends of said plurality of pillars.

7. The reinforcement assembly as claimed in claim 1, wherein said load distributing medium is a polymer foam.

8. The reinforcement assembly as claimed in claim 1, wherein said load distributing medium is an epoxy-based polymer foam.

9. The reinforcement assembly as claimed in claim 1, wherein said load distributing medium is a heat activated expandable polymer foam.

10. A reinforcement assembly for reinforcing a tubular structural member, comprising:
    a plurality of rigid pillars arranged in a spaced relationship relative to a resilient retainer; and
    an expandable load distributing medium disposed on at least one surface of each of said plurality of pillars,
    wherein, upon insertion of the assembly in the tubular structural member, the plurality of pillars are adapted to move toward and away from each other to accommodate changing cross-sectional areas of a structure to be reinforced.

11. The reinforcement assembly of claim 10, wherein at least one of said plurality of pillars has a cross-sectional shape selected from the group consisting of round, square, and hexagonal.

12. The reinforcement assembly of claim 10, wherein said plurality of pillars are made of at least one selected from the group including steel, aluminum, magnesium, nylon, polysulfone, and sheet molding compound.

13. The reinforcement assembly of claim 10, wherein said plurality of pillars are tube-shaped.

14. The reinforcement assembly as claimed in claim 10, wherein said expandable load distributing medium is a polymer foam.

15. The reinforcement assembly as claimed in claim 10, wherein said expandable material is an epoxy-based polymer foam.

16. The reinforcement assembly as claimed in claim 10, wherein said expandable load distributing medium is a heat activated expandable polymer foam.

17. A method for reinforcing a tube structure, comprising the steps of:
    arranging a plurality of rigid pillars in a spaced relationship, each pillar having an expandable load distributing medium disposed on at least one surface of each of said plurality of pillars;
    retaining the plurality of pillars in a predetermined arrangement with a resilient retainer, wherein the retainer allows the plurality of pillars to move toward and away from each other to accommodate changing cross-sectional areas of a structure to be reinforced;
    positioning the plurality of pillars in the tube structure at a desired location; and
    expanding the load distributing medium to hold the plurality of pillars at the desired location.

18. The method of claim 17, wherein the retaining step is conducted by coupling at least one retaining mechanism coupled to at least one end of the plurality of pillars.

19. The method of claim 17, wherein the retaining step and the positioning step are conducted by engaging said plurality of pillars with an external means.

20. The method recited in claim 17, wherein the expanding step is conducted by heating the load distributing medium to activate thermal expansion of the load distributing medium.

* * * * *